(12) United States Patent
Kawasaki

(10) Patent No.: US 8,837,009 B2
(45) Date of Patent: Sep. 16, 2014

(54) LIGHT GUIDING MEMBER, IMAGE READING DEVICE, AND IMAGE FORMING APPARATUS INCLUDING THE IMAGE READING DEVICE

(71) Applicant: Kyocera Document Solutions Inc., Osaka (JP)

(72) Inventor: Kenichiro Kawasaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/754,290

(22) Filed: Jan. 30, 2013

(65) Prior Publication Data

US 2013/0194642 A1    Aug. 1, 2013

(30) Foreign Application Priority Data

Jan. 31, 2012    (JP) ................................. 2012-018240

(51) Int. Cl.

| | |
|---|---|
| *H04N 1/04* | (2006.01) |
| *G03B 21/14* | (2006.01) |
| *G02B 5/02* | (2006.01) |
| *F21V 3/00* | (2006.01) |
| *F21V 7/04* | (2006.01) |
| *G09G 5/10* | (2006.01) |
| *G02F 1/1335* | (2006.01) |
| *H04N 1/028* | (2006.01) |

(52) U.S. Cl.
CPC ............ *H04N 1/0289* (2013.01); *G02B 5/0215* (2013.01); *H04N 1/02825* (2013.01); *H04N 1/02835* (2013.01); *G02B 5/02* (2013.01); *G02B 5/0278* (2013.01)
USPC ............. 358/474; 358/484; 353/38; 359/599; 362/558; 362/311.07; 362/600; 345/690; 349/5

(58) Field of Classification Search
CPC .... G02B 27/48; G02B 5/208; H04N 1/02825; H04N 1/02835; H04N 1/0289
USPC ............. 358/484; 353/38; 359/599; 362/621; 385/124
See application file for complete search history.

(56) References Cited

U.S. PATENT DOCUMENTS

2011/0044059 A1*    2/2011    Inoue et al. ............... 362/311.07
2012/0019877 A1*    1/2012    Yamaguchi et al. .......... 358/474

FOREIGN PATENT DOCUMENTS

| JP | 09-247368 | 9/1997 |
|---|---|---|
| JP | 11-185516 | 7/1999 |
| JP | 2008-140726 | 6/2008 |

* cited by examiner

*Primary Examiner* — Charlotte M Baker
*Assistant Examiner* — Rury Grisham
(74) *Attorney, Agent, or Firm* — K&L Gates LLP

(57) ABSTRACT

A light guiding member includes an input surface, an output surface, a counter surface, a reflective portion, and a diffusing portion. The light guiding member is a rod-shaped member that guides light in a longitudinal direction thereof. The input surface is one end face of the light guiding member and allows light to be input thereon. The output surface has a belt-like shape, extends in the longitudinal direction, and allows light to be emitted therefrom. The counter surface is located opposite the output surface. The reflective portion is a belt-like portion extending in the longitudinal direction and reflects light toward the output surface. The diffusing portion is a belt-like portion extending in the longitudinal direction and diffuses light emitted from the output surface. The diffusing portion is smaller than the reflective portion in width in a direction orthogonal to the longitudinal direction.

12 Claims, 11 Drawing Sheets

LIGHT GUIDING MEMBER, IMAGE READING DEVICE, AND IMAGE FORMING APPARATUS INCLUDING THE IMAGE READING DEVICE

INCORPORATION BY REFERENCE

This application is based upon, and claims the benefit of priority from, corresponding Japanese Patent Application No. 2012-018240 filed in the Japan Patent Office on Jan. 31, 2012, the entire contents of which are incorporated herein by reference.

BACKGROUND

The present disclosure relates to a light guiding member that guides light from a light source and linearly emits the light, an image reading device that reads an image of a document illuminated with the light from the light guiding member, and an image forming apparatus that forms an image on a sheet based on the image read by the image reading device.

A scanner device is known which includes an illuminating unit that illuminates a document by using a rod-shaped light guiding member that guides light from a light-emitting diode (LED). The periphery of the light guiding member is provided with a reflective member on one side. The reflective member reflects light so as to guide it in a direction orthogonal to a direction in which the light guiding member extends. The document is illuminated with the reflected light extending linearly in a main scanning direction. This illuminating unit, which has the LED on only one side adjacent to an input surface at an end of the light guiding member, is advantageous in that it can reduce the number of LEDs. This illuminating unit is also advantageous in that it can reduce a loss of LED light, because light guided into the light guiding member propagates inside the light guiding member while being totally reflected by the inner surface of the light guiding member in accordance with Snell's law.

In such an illuminating unit, characteristics of light distribution in a sub-scanning direction vary depending on the number of reflections of the light on the inner surface of the light guiding member. Specifically, light emitted from the light guiding member in the vicinity of the LED is reflected less frequently inside the light guiding member, whereas light emitted from the light guiding member at a location remote from the LED is reflected more frequently inside the light guiding member. Since the light reflected less frequently is diffused to a lesser extent by the reflection, the light is emitted within a narrow range in the sub-scanning direction in the vicinity of the LED. On the other hand, since the light reflected more frequently is diffused to a greater extent by the reflection, the light is diffused and emitted over a wide range in the sub-scanning direction at a location remote from the LED.

If, as described above, the distribution of light in the sub-scanning direction varies depending on the position in the main scanning direction, the level of change in illuminance caused by floating of a document varies depending on the position in the main scanning direction. This is inconvenient in that the degree of non-uniformity in illuminance caused by floating of a document may increase.

An illuminating unit is known in which the entire output surface on a light emitting side of the periphery of a light guiding member, the output surface having an area about half that of the periphery of the light guiding member, is provided with a diffusing member that diffuses light with a grained surface or a surface with rounded grooves and ridges. Light emitted from the output surface is diffused by the diffusing member in the sub-scanning direction. This can reduce the degree of non-uniformity in the distribution of light in the sub-scanning direction. Additionally, with this illuminating unit, where the diffusing member of the light guiding member is located in the vicinity of the LED, light having a narrow range of distribution can be effectively diffused.

However, in the illuminating unit described above, not all the light emitted from the light guiding member in the vicinity of the LED has a narrow range of light distribution in the sub-scanning direction. That is, the light emitted from the light guiding member in the vicinity of the LED includes light that has a wide range of light distribution in the sub-scanning direction. Therefore, of the light emitted from the light guiding member in the vicinity of the LED, light originally having a wide range of light distribution in the sub-scanning direction is also diffused by the diffusing member. A loss of light may occur when light is diffused by the diffusing member. Accordingly, if light originally having a wide range of light distribution in the sub-scanning direction is diffused by the diffusing member, there may be an unnecessary increase in the loss of light.

SUMMARY

A light guiding member according to an embodiment of the present disclosure is a rod-shaped member that guides light in a longitudinal direction thereof. The light guiding member has an input surface, an output surface, and a counter surface. The input surface is one end face of the light guiding member and allows light to be inputted thereon. The output surface has a belt-like shape, extends in the longitudinal direction, and allows light to be emitted therefrom. The counter surface is in the periphery of the light guiding member and opposite the output surface. The output surface has a belt-like diffusing portion extending in the longitudinal direction, the diffusing portion being configured to diffuse light emitted from the output surface. The counter surface has a belt-like reflective portion extending in the longitudinal direction, the reflective portion being configured to reflect light toward the output surface. The width of the diffusing portion in a direction orthogonal to the longitudinal direction is smaller than the width of the reflective portion in the direction orthogonal to the longitudinal direction.

An image reading device according to another embodiment of the present disclosure includes a light source, a light guiding member, and an image reading unit. The light guiding member has a rod-like shape, guides light from the light source in a longitudinal direction thereof, and illuminates a document with the light. The image reading unit reads an image of the document illuminated with the light from the light guiding member. The light guiding member has an input surface, an output surface, and a counter surface. The input surface is one end face of the light guiding member and allows light to be inputted thereon. The output surface has a belt-like shape, extends in the longitudinal direction, and allows light to be emitted therefrom. The counter surface is in the periphery of the light guiding member and opposite the output surface. The output surface has a belt-like diffusing portion extending in the longitudinal direction, the diffusing portion being configured to diffuse light emitted from the output surface. The counter surface has a belt-like reflective portion extending in the longitudinal direction, the reflective portion being configured to reflect light toward the output surface. The width of the diffusing portion in a direction orthogonal to the longitudinal direction is smaller than the width of the reflective portion in the direction orthogonal to the longitudinal direction.

An image forming apparatus according to another embodiment of the present disclosure includes a light source, a light guiding member, an image reading unit, and an image forming section. The light guiding member has a rod-like shape, guides light from the light source in a longitudinal direction thereof, and illuminates a document with the light. The image reading unit reads an image of the document illuminated with the light from the light guiding member. The image forming section forms an image on a sheet based on the image read by the image reading unit. The light guiding member has an input surface, an output surface, and a counter surface. The input surface is one end face of the light guiding member and allows light to be inputted thereon. The output surface has a belt-like shape, extends in the longitudinal direction, and allows light to be emitted therefrom. The counter surface is in the periphery of the light guiding member and opposite the output surface. The output surface has a belt-like diffusing portion extending in the longitudinal direction, the diffusing portion being configured to diffuse light emitted from the output surface. The counter surface has a belt-like reflective portion extending in the longitudinal direction, the reflective portion being configured to reflect light toward the output surface. The width of the diffusing portion in a direction orthogonal to the longitudinal direction is smaller than the width of the reflective portion in the direction orthogonal to the longitudinal direction.

Additional features and advantages are described herein, and will be apparent from the following Detailed Description and the figures.

DETAILED DESCRIPTION

Figure 1:
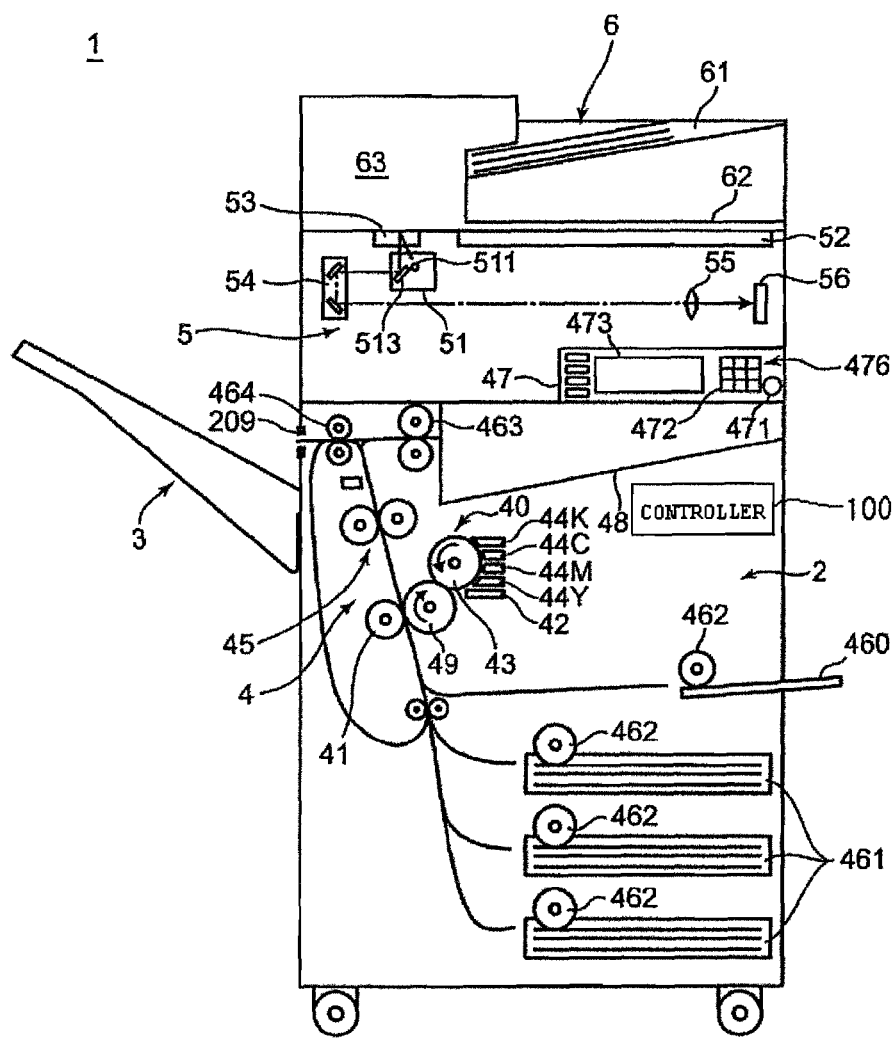
FIG. 1 is a schematic side view illustrating an internal configuration of a copier, which is an example of an image forming apparatus according to an embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Embodiments of the present disclosure will now be described with reference to the drawings.

In the drawings, the same components are given the same reference numerals and their description will not be repeated. FIG. 1 is a schematic side view illustrating an internal configuration of a copier, which is an example of an image forming apparatus according to an embodiment of the present disclosure. The image forming apparatus is not limited to a copier and may be, for example, a facsimile or a multifunction peripheral.

A copier 1 includes an apparatus main body 2, a stacking tray 3 located to the left of the apparatus main body 2, an image reading device 5 according to an embodiment of the present disclosure located above the apparatus main body 2, a document feeding unit 6 located above the image reading device 5, and a controller 100 located inside the apparatus main body 2 and having a microcomputer. The copier 1 includes a substantially rectangular operation panel 47 at the front thereof.

An upper surface of the image reading device 5 is provided with a document table 52 made of transparent material, such as glass, and a contact glass plate 53. The image reading device 5 includes a scanning section 51, a mirror unit 54, an imaging lens 55, and an image pickup element 56 (which is an example of an image reading unit) that are located below the document table 52 and the contact glass plate 53.

The image reading device does not necessarily have to be included in the image forming apparatus. For example, the image reading device may be a scanner device that can be independently used.

The scanning section 51 includes a linear light source unit 511 and a mirror 513. The linear light source unit 511 illuminates a document with illuminating light through the document table 52 or the contact glass plate 53. The mirror 513 reflects light reflected by the document toward the mirror unit 54.

The mirror unit 54 reflects light reflected by the mirror 513 toward the imaging lens 55.

The imaging lens 55 collects light reflected by the mirror unit 54 to form an image on the image pickup element 56.

The image pickup element 56, such as a charge-coupled device (CCD) image sensor, photoelectrically converts light collected by the imaging lens 55 into document image data.

The linear light source unit 511, the mirror 513, the mirror unit 54, the imaging lens 55, and the image pickup element 56 extend at least across the entire width of the document table 52 and the contact glass plate 53 in the main scanning direction.

The scanning section 51 is driven, for example, by a stepping motor (not shown) and displaced in the horizontal direction in FIG. 1, that is, in the sub-scanning direction. When the scanning section 51 and the mirror unit 54 are displaced at a velocity of V and a velocity of V/2, respectively, in the sub-scanning direction, an image of a document placed on the document table 52 is formed on the image pickup element 56 always with the same optical-path length.

When reading a document fed by the document feeding unit 6, the scanning section 51 stops to face the contact glass plate 53. Then, the scanning section 51, the mirror unit 54, and the imaging lens 55 form an image of the document on the image pickup element 56. While the document feeding unit 6 is feeding the document, the image pickup element 56 acquires the image of the document and outputs the corresponding image data to the controller 100.

The mirror 513, the mirror unit 54, the imaging lens 55, and the image pickup element 56 may be replaced by a contact image sensor (CIS) extending in the main scanning direction.

The document feeding unit 6 includes a document tray 61 on which documents are placed, a document discharge unit 62 to which a document whose image has been read is discharged, and a document conveying mechanism 63. The document conveying mechanism 63 includes paper feed rollers (not shown) and conveyance rollers (not shown) for feeding documents one by one from the document tray 61, feeding a document to a position facing the contact glass plate 53, and discharging it to the document discharge unit 62.

The document feeding unit 6 is pivotally attached to the apparatus main body 2 such that the front side of the document feeding unit 6 can be raised. In the copier 1, when the front side of the document feeding unit 6 is raised to open the upper surface of the document table 52, the user can place a document to be read, such as a book in an open state, on the upper surface of the document table 52.

The apparatus main body 2 includes a manual feed tray 460, a plurality of paper feed cassettes 461, a plurality of paper feed rollers 462, an image forming section 4, an output tray 48, and the controller 100. The image forming section 4 includes an image forming assembly 40, a fixing unit 45, and various conveyance rollers located on a sheet conveying path in the image forming section 4. The image forming assembly 40 includes an exposure unit 42, a photosensitive drum 43, developing units 44Y, 44M, 44C, and 44K for yellow, magenta, cyan, and black colors, respectively, an intermediate transfer roller 49, and a transfer roller 41.

The photosensitive drum 43 is uniformly charged by a charging unit (not shown) while rotating in the direction of the arrow illustrated in FIG. 1. Based on the image data of a document read by the image reading device 5, the exposure unit 42 converts a modulating signal generated by the controller 100 into laser light, outputs it, and forms an electrostatic latent image of each color on the photosensitive drum 43. The developing units 44Y, 44M, 44C, and 44K supply developers of the respective colors to the photosensitive drum 43 to form toner images of the respective colors. The toner images of the respective colors are transferred from the photosensitive drum 43 onto the intermediate transfer roller 49. Thus, a color toner image is formed on the intermediate transfer roller 49.

The paper feed rollers 462 each are configured to pull a sheet out of the manual feed tray 460 or the corresponding paper feed cassette 461 holding sheets, and feed the sheet to the transfer roller 41. The transfer roller 41 transfers the toner image from the intermediate transfer roller 49 to the fed sheet. The fixing unit 45 heats the transferred toner image to fix the toner image onto the sheet. Then, the sheet is discharged from a discharge port 209 of the apparatus main body 2 to the stacking tray 3. The sheet may be discharged to the output tray 48 as necessary.

Figure 2:
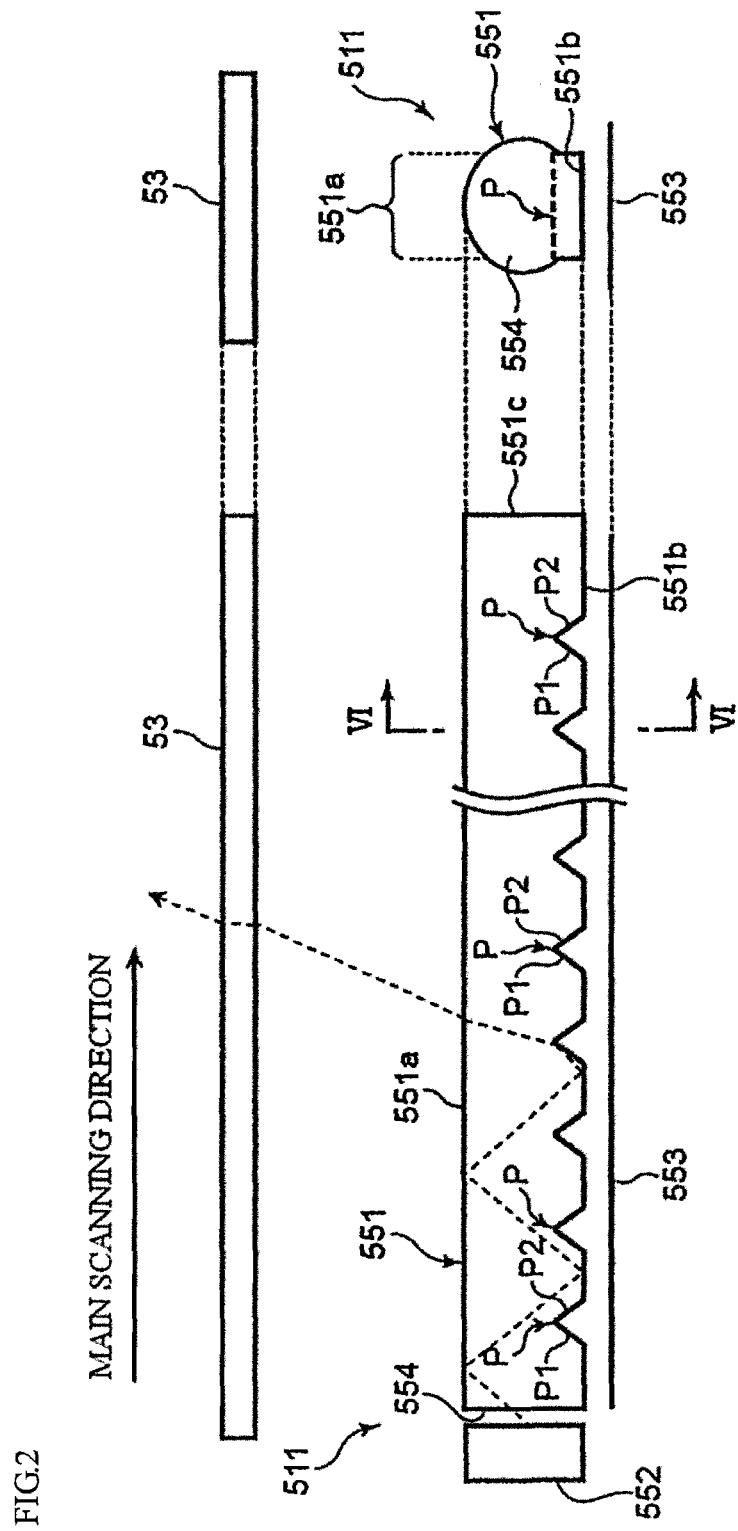
FIG. 2 is a schematic view illustrating a configuration of a linear light source unit illustrated in FIG. 1.

FIG. 2 illustrates a configuration of the linear light source unit 511. In FIG. 2, the linear light source unit 511 is located below the contact glass plate 53. In the left-hand side of FIG. 2, a cross-sectional view of the linear light source unit 511 taken along the longitudinal direction (main scanning direction) is shown. The linear light source unit 511 includes a light guiding member 551, a light source 552, and a plate-like reflective member 553. The right-hand side of FIG. 2 is a front view of the light guiding member 551, as viewed from an input surface 554 on which light from the light source 552 is inputted.

The light guiding member 551 is a rod-shaped member for guiding light in the longitudinal direction. The light guiding member 551 is, for example, a substantially cylindrical member made of transparent resin material. The light source 552 is positioned to face one end face (first end face) of the light guiding member 551. The first end face is the input surface 554. The light source 552 is, for example, a white LED. The light source 552 emits light toward the input surface 554.

A portion of the periphery of the light guiding member 551, the portion facing the contact glass plate 53, is a belt-like output surface 551a through which light is emitted from the light guiding member 551 to the outside. A portion of the periphery of the light guiding member 551, the portion being opposite the output surface 551a, is a base surface 551b (which is an example of a counter surface). The base surface 551b reflects a part of light propagating inside the light guiding member 551 toward the output surface 551a. The reflective member 553 is positioned to face the base surface 551b. The reflective member 553 reflects light that has passed through the base surface 551b back to the light guiding member 551.

The base surface 551b is provided with a plurality of grooves P that act as prisms. The grooves P extend in a direction orthogonal to the longitudinal direction of the light guiding member 551 and are arranged at predetermined intervals in the longitudinal direction of the light guiding member 551. The other end face (second end face) of the light guiding member 551, the other end face being opposite the input surface 554, is a reflective end face 551c. The reflective end face 551c is, for example, covered with an evaporated aluminum film or with an aluminum sheet attached thereto. Light traveling from inside the light guiding member 551 toward the outside is reflected back into the light guiding member 551 by the reflective end face 551c. With this configuration, a reflective portion A1 (see FIG. 5, described below) can efficiently reflect light toward the output surface 551a.

The grooves P, having a wedge shaped cross section, are formed by cutting away portions of the base surface 551b. A surface of each groove P facing to the input surface 554 is a first prism face P1, and the other surface of the groove P facing to the reflective end face 551c (which is opposite the input surface 554) is a second prism face P2.

Light emitted from the light source 552 passes through the input surface 554 to enter the light guiding member 551. The light guiding member 551 allows the light from the input surface 554 to be repeatedly reflected by its inner surface (i.e., at the interface with air). Thus, the light guiding member 551 guides light in the longitudinal direction of the light guiding member 551, that is, in the main scanning direction. The light is partially reflected by the grooves P toward the output surface 551a, and passes through the output surface 551a to reach a document on the contact glass plate 53.

At the same time, the light partially passes through the base surface 551b and leaks out of the light guiding member 551. However, the light that has passed through the base surface 551b is reflected by the reflective member 553 back into the light guiding member 551. This can reduce a loss of light in the linear light source unit 511.

Figure 3:
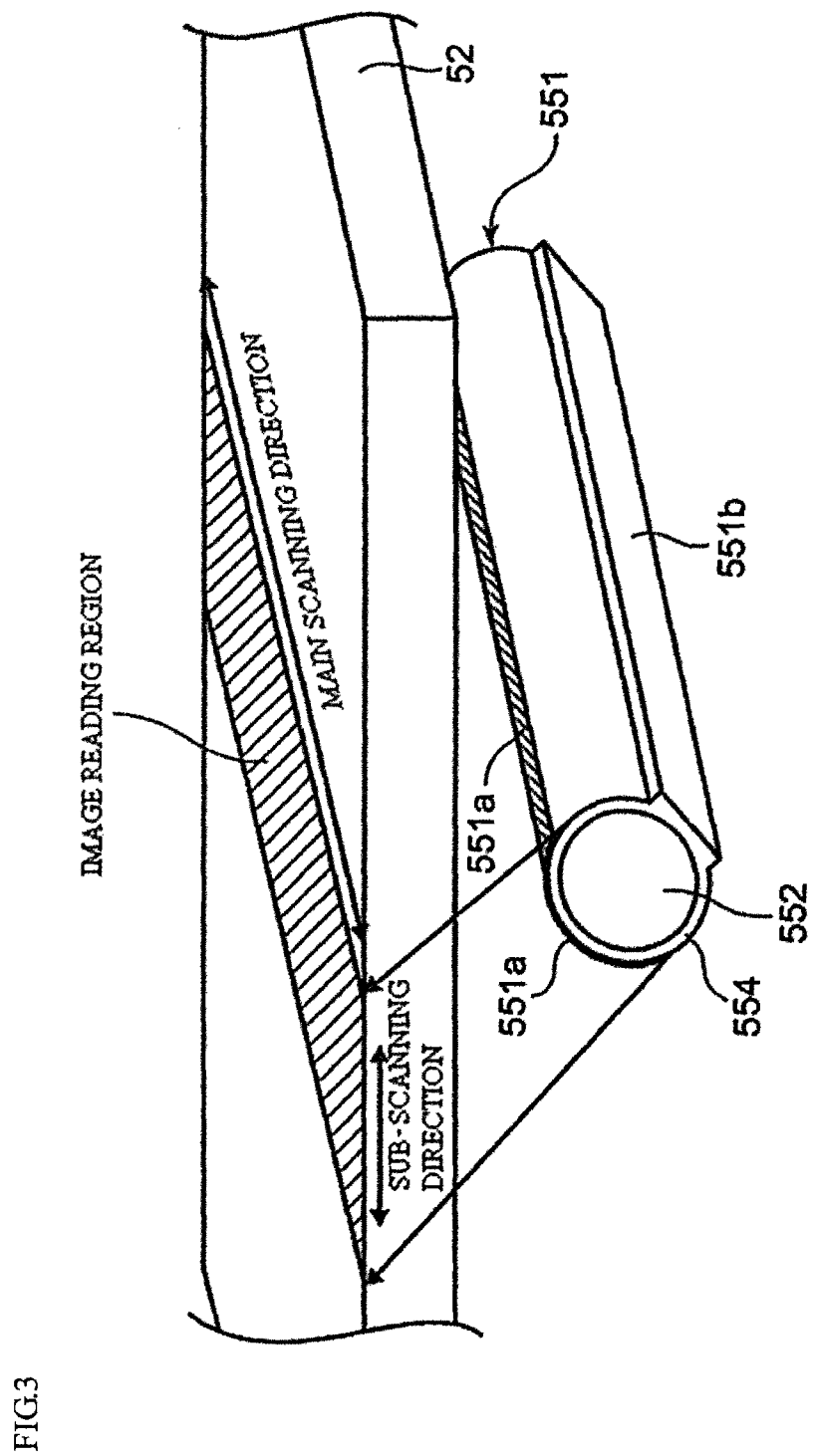
FIG. 3 is a schematic perspective view illustrating a configuration of the linear light source unit of FIG. 1.

FIG. 3 is a perspective view illustrating a configuration of the linear light source unit 511. In FIG. 3, the linear light source unit 511 is located below the document table 52. The linear light source unit 511 is positioned to emit light at an angle to the document table 52. Note that the reflective member 553 is not shown in FIG. 3. As illustrated in FIG. 3, a belt-like image reading region of the document table 52 is illuminated with light emitted from the output surface 551a.

Figure 4:
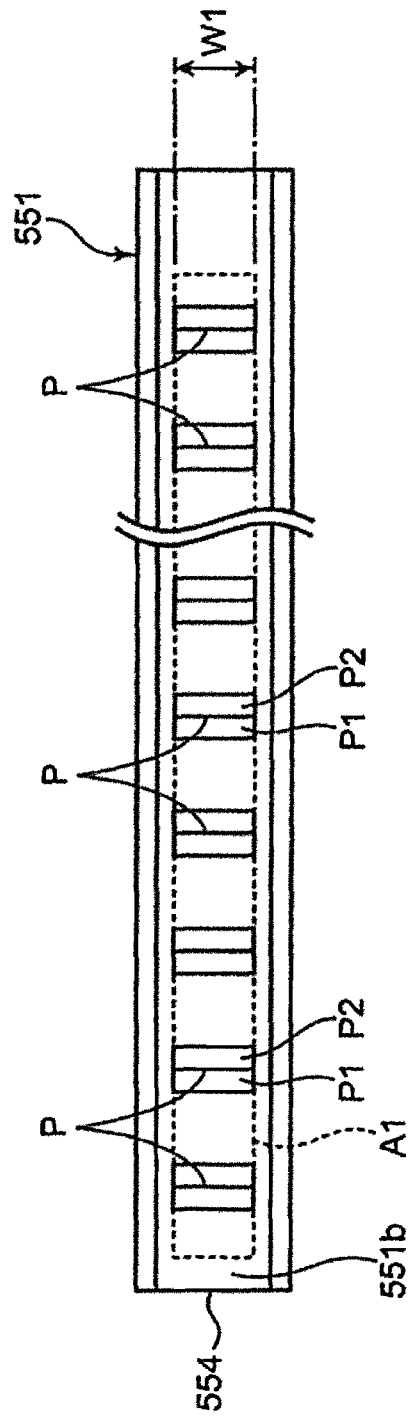
FIG. 4 is a schematic plan view of a light guiding member illustrated in FIG. 2, as viewed from a base surface.

FIG. 4 is a plan view of the light guiding member 551 illustrated in FIG. 2, as viewed from the base surface 551b. As illustrated in FIG. 4, a belt-like area including the plurality of grooves P is defined as the reflective portion A1. In FIG. 4, the width of the reflective portion A1 in a direction orthogonal to the longitudinal direction of the light guiding member 551 is denoted by reference symbol W1. The length of the grooves P in the direction orthogonal to the longitudinal direction of the light guiding member 551 is equal to the width W1 of the reflective portion A1.

The reflective portion A1 may have any configuration that can reflect light at many angles, and is not limited to that having the plurality of grooves P. For example, the reflective portion A1 may be a belt-like rough area formed by roughening part of the base surface 551b. However, as compared to the reflective portion A1 formed by a rough area, the reflective portion A1 formed by the plurality of grooves P is more preferable, because it can more efficiently reflect light and reduce a loss of the energy of the light.

Figure 5:
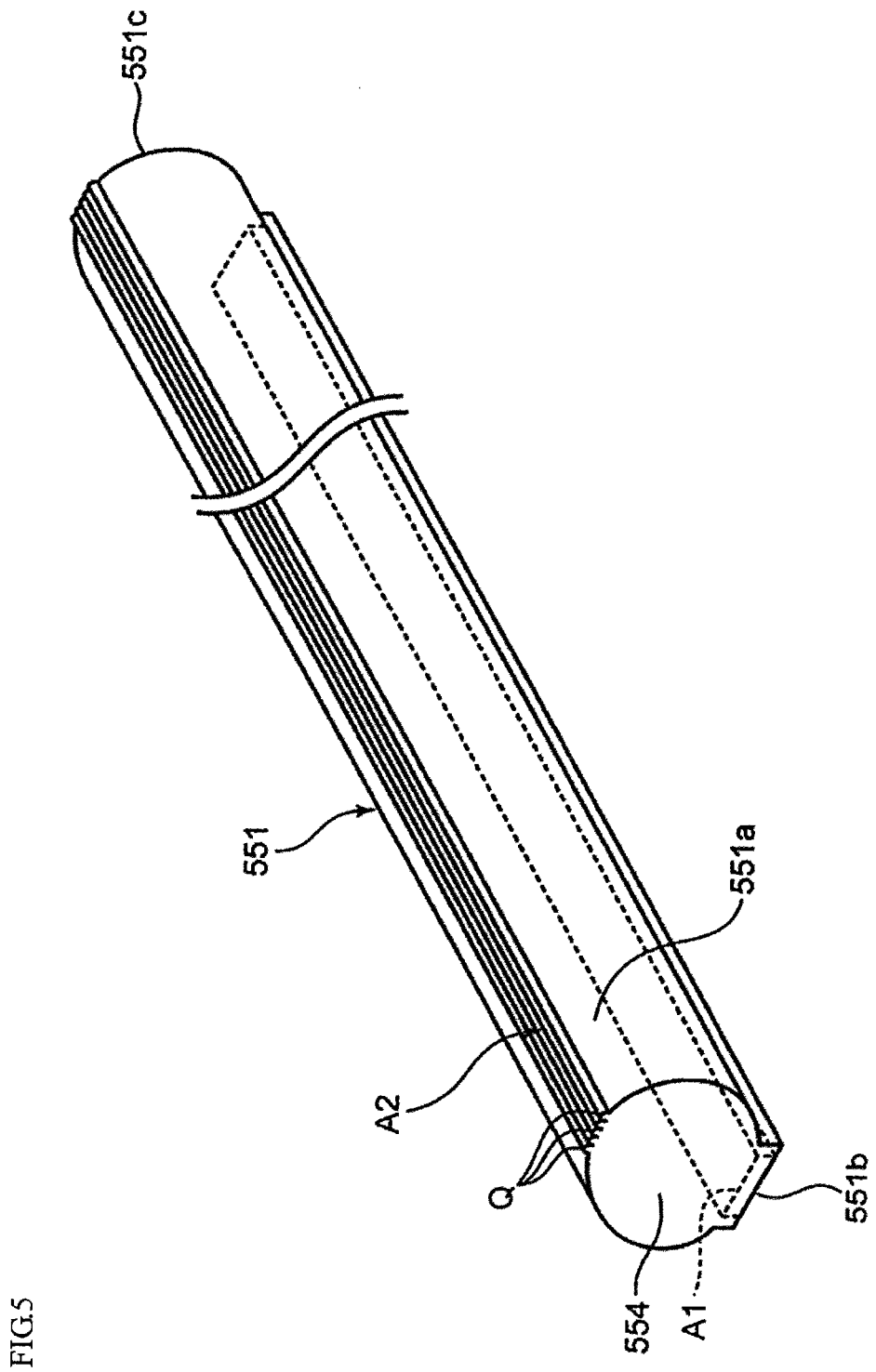
FIG. 5 is a schematic perspective view of the light guiding member illustrated in FIG. 2, as viewed from an output surface.

FIG. 5 is a schematic perspective view of the light guiding member 551, as viewed from the output surface 551a. As illustrated in FIG. 5, the output surface 551a has a diffusing portion A2 extending in the longitudinal direction of the light guiding member 551. The diffusing portion A2 is formed by a plurality of ridges Q extending in the longitudinal direction of the light guiding member 551 and arranged in the direction orthogonal to the longitudinal direction of the light guiding member 551. The ridges Q have a round cross sectional shape orthogonal to the longitudinal direction thereof. With this configuration, light emitted through the diffusing portion A2 can be effectively diffused in a direction (sub-scanning direction) orthogonal to the longitudinal direction of the ridges Q. Thus, it is possible to effectively reduce the degree of non-uniformity in the distribution of light in the sub-scanning direction.

Figure 6:
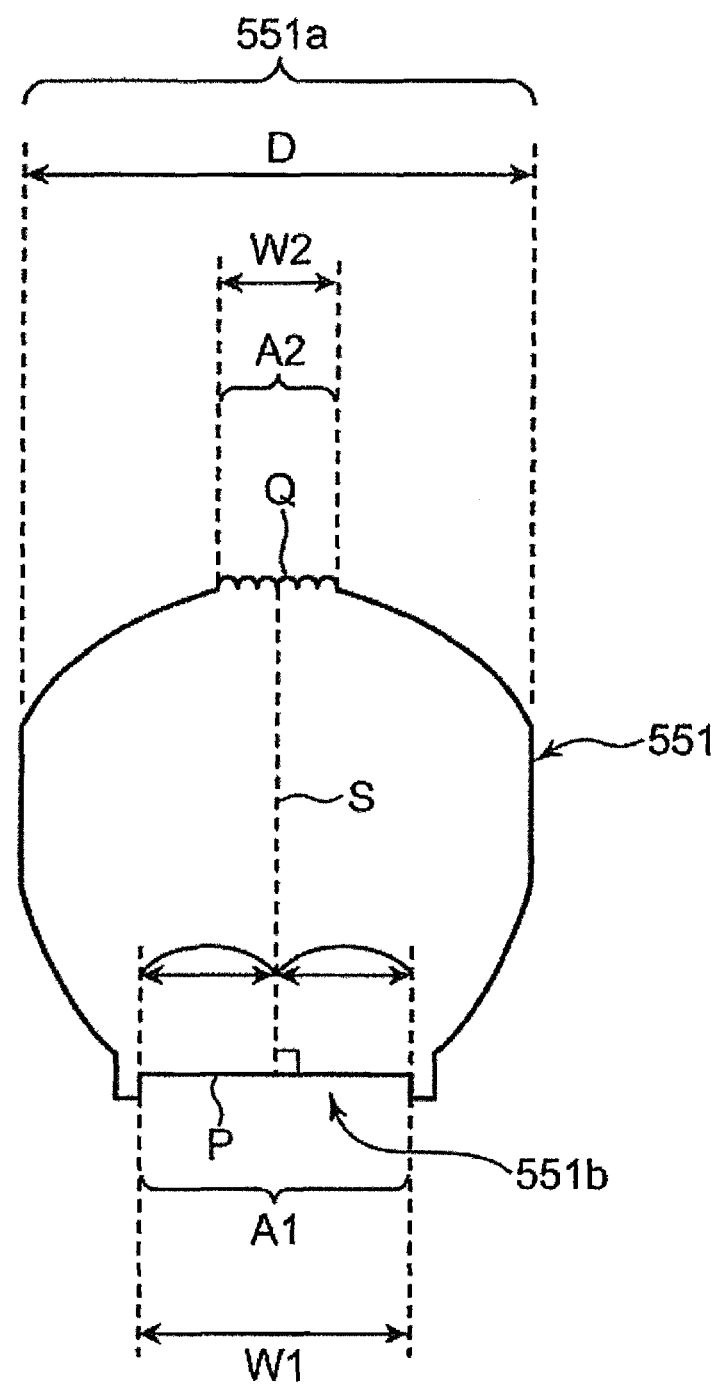
FIG. 6 is a cross-sectional view of the light guiding member illustrated in FIG. 2, taken along line VI-VI at the tip of a groove.

FIG. 6 is a cross-sectional view of the light guiding member 551 illustrated in FIG. 2, taken along line VI-VI at the tip of one of the grooves P. In FIG. 6, the width of the diffusing portion A2 in a direction orthogonal to the longitudinal direction of the light guiding member 551 is denoted by reference symbol W2. The width W2 of the diffusing portion A2 is smaller than the width W1 of the reflective portion A1. For example, the width W1 is 2.5 mm and the width W2 is 1.1 mm. The ridges Q each have, for example, a semicircular (or rounded) shape with a radius of about 20 μm in cross section orthogonal to the longitudinal direction thereof.

In FIG. 6, a dotted auxiliary line S represents a virtual vertical plane passing through a center of the base surface 551b in the width direction and extending in a direction perpendicular to the base surface 551b. The diffusing portion A2 is positioned such that a position at which the auxiliary line S intersects the output surface 551a coincides with an approximate center of the width W2. In other words, in a cross section orthogonal to the longitudinal direction of the light guiding member 551, the auxiliary line S passing through the center of the base surface 551b in the width direction and extending in the direction perpendicular to the base surface 551b passes through an approximate center position in the width direction of the diffusing portion A2. That is, the diffusing portion A2 is located in a virtual vertical plane passing through the center of the reflective portion A1 in the width direction and extending in a direction perpendicular to the base surface 551b.

The light guiding member 551 has a thickness (or outside diameter) D of, for example, about 5.0 mm. To reduce a loss of energy of light guided by the light guiding member 551, it is preferable that the width W1 of the reflective portion A1 be less than or equal to half the thickness D.

The diffusing portion A2 may have any configuration that can reflect light at many angles, and is not limited to that having the plurality of ridges Q. For example, the diffusing portion A2 may be a belt-like rough area formed in part of the output surface 551a. However, if the diffusing portion A2 is formed by such a rough area, the direction of light diffusion cannot be controlled by the diffusing portion A2 and light is randomly diffused. With the diffusing portion A2 formed by the plurality of ridges Q, light emitted through the diffusing portion A2 can be effectively diffused in the sub-scanning direction. Therefore, with the plurality of ridges Q, it is possible to more effectively reduce the degree of non-uniformity in the distribution of light in the sub-scanning direction than with the rough area described above.

Figure 7:
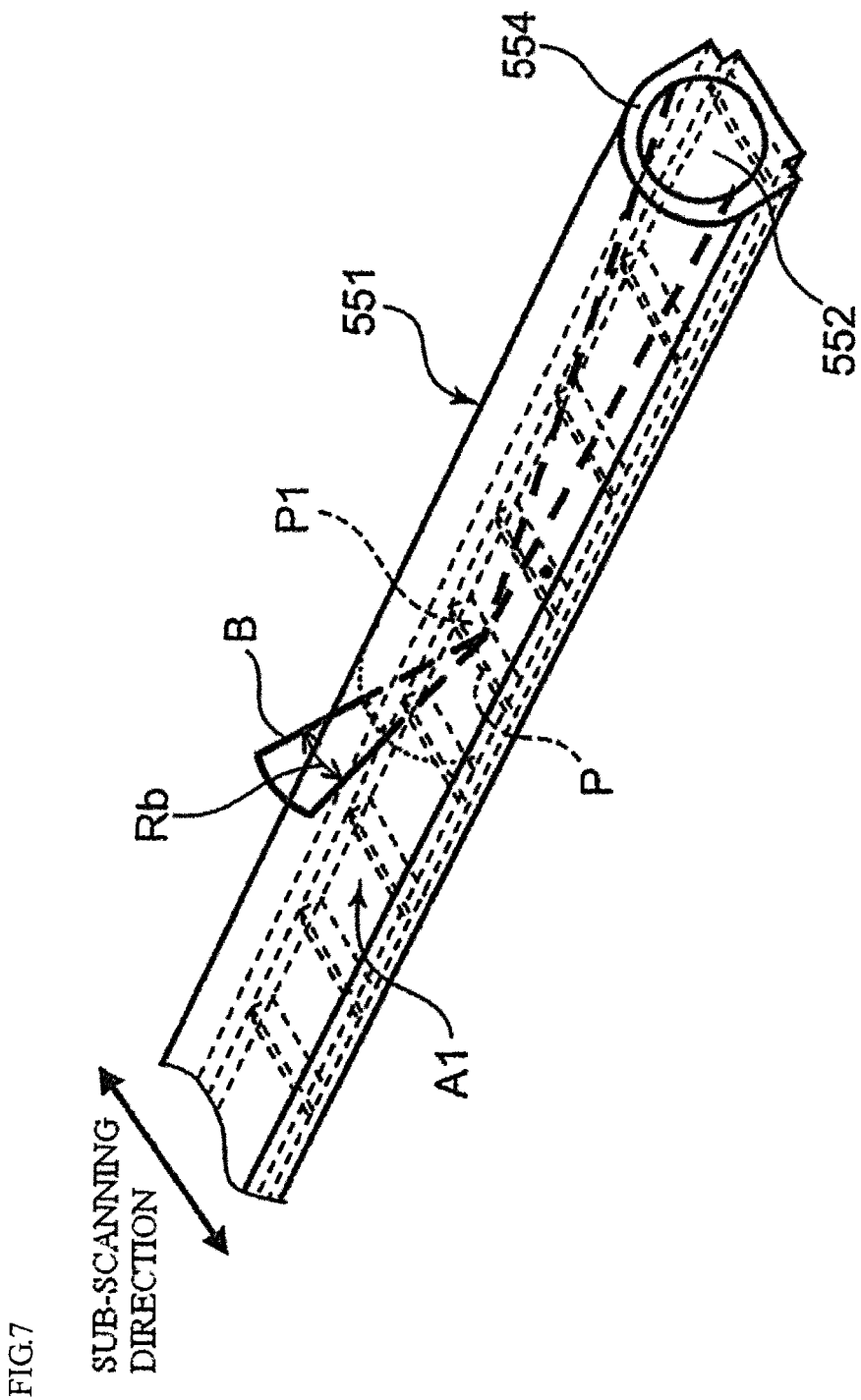
FIG. 7 is a diagram for explaining the relationship between the number of reflections of light inside the light guiding member and light distribution characteristics of light emitted from the light guiding member according to an embodiment of the present disclosure.
Figure 8:
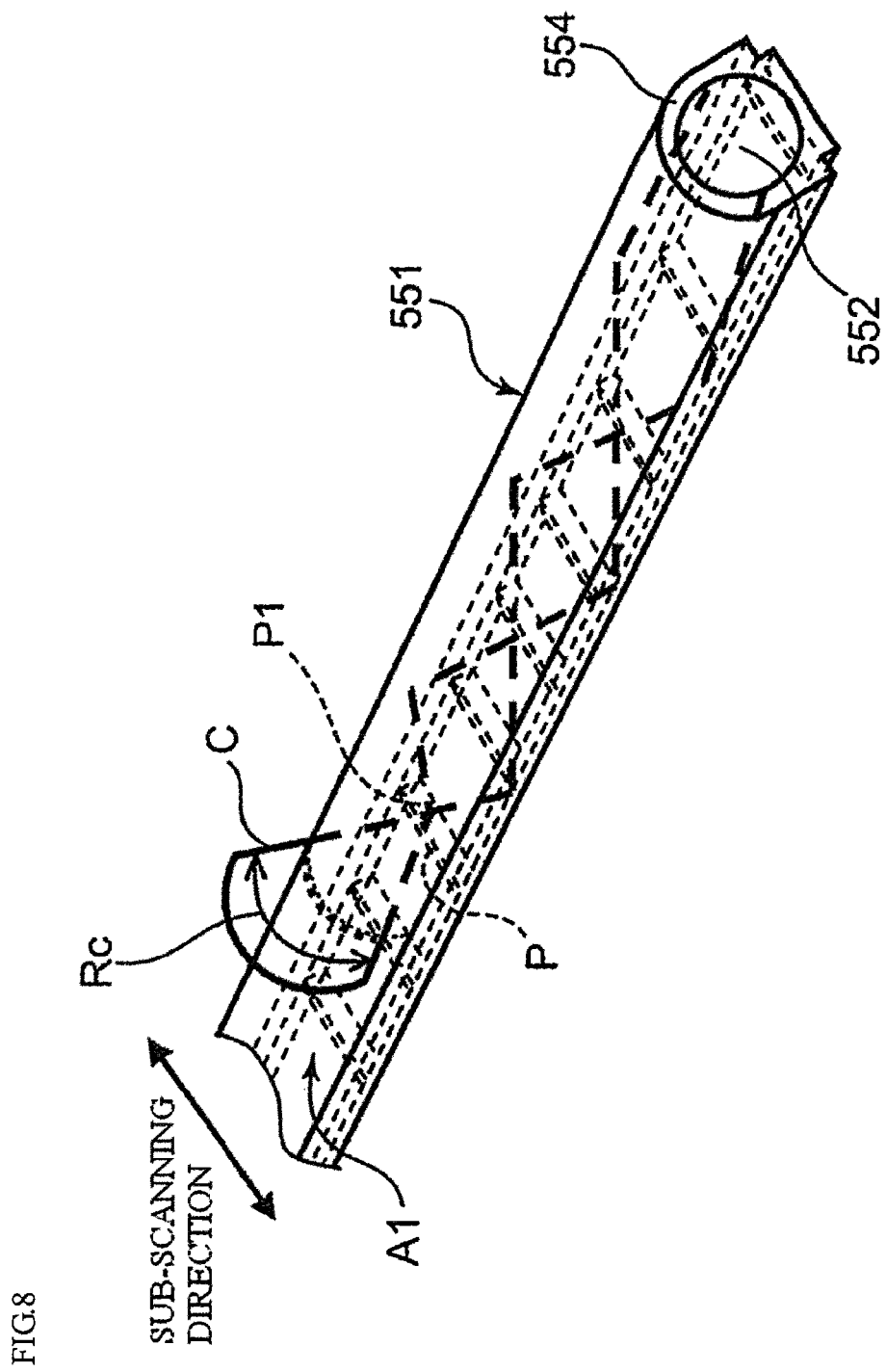
FIG. 8 is another diagram for explaining the relationship between the number of reflections of light inside the light guiding member and light distribution characteristics of light emitted from the light guiding member according to an embodiment of the present disclosure.

FIG. 7 and FIG. 8 are each a diagram for explaining the relationship between the number of reflections of light inside the light guiding member 551 and light distribution characteristics of light emitted from the light guiding member 551. FIG. 7 illustrates light distribution characteristics of first reflected light B reflected less than twice inside the light guiding member 551. FIG. 8 illustrates light distribution characteristics of second reflected light C reflected more than once inside the light guiding member 551.

After being emitted from the light source 552, the first reflected light B illustrated in FIG. 7 directly hits the first prism face P1 of one of the grooves P without being reflected by the inner surface of the light guiding member 551, and is reflected toward the output surface 551a. The first reflected light B, which is not reflected by the inner surface of the light guiding member 551, is diffused very little before being reflected by the first prism face P1 and emitted from the output surface 551a to the outside. Therefore, the light distribution angle Rb, by which the first reflected light B emitted from the output surface 551a spreads out in the sub-scanning direction, is relatively small. That is, the first reflected light B is emitted from the output surface 551a within a narrow range.

In contrast, the second reflected light C illustrated in FIG. 8 is reflected multiple times by the inner surface of the light guiding member 551. Then, the second reflected light C hits the first prism face P1 of one of the grooves P and is reflected toward the output surface 551a. The second reflected light C is diffused every time it is reflected by the inner surface of the light guiding member 551. After repeatedly being diffused, the second reflected light C is reflected by the first prism face P1 and emitted from the output surface 551a to the outside. Therefore, the light distribution angle Rc, by which the second reflected light C emitted from the output surface 551a spreads out in the sub-scanning direction, is greater than the light distribution angle Rb. That is, the second reflected light C is diffused over a wide range and emitted from the output surface 551a.

If the diffusing portion extends over the entire area of the output surface 551a, it is possible to diffuse the first reflected light B, which is diffused very little before being emitted from the output surface 551a. With this configuration, however, the second reflected light C, which is repeatedly diffused before being emitted from the output surface 551a, will be almost entirely diffused. In this case, an unnecessary loss of energy occurs when the second reflected light C is diffused by the diffusing portion.

In the light guiding member 551 illustrated in FIG. 5 and FIG. 6, the width W2 of the diffusing portion A2 is smaller than the width W1 of the reflective portion A1, and the diffusing portion A2 forms only a part of the output surface 551a in the width direction. Therefore, as compared to the situation where a diffusing portion extends over the entire area of the output surface 551a in the width direction, the amount of second reflected light C diffused by the diffusing portion A2 is smaller, and the amount of second reflected light C emitted from the output surface 551a without being diffused by the diffusing portion A2 is larger. Thus, as compared to the case where a diffusing portion extends over the entire area of the output surface 551a, the loss of energy of emitted light can be reduced.

As illustrated in FIG. 7, the first reflected light B is reflected by the first prism face P1 of one of the grooves P and emitted from the output surface 551a within a narrow range centered on a line where a virtual vertical plane intersects the output surface 551a, the vertical plane passing through a position directly above the reflective portion A1 (i.e., passing through a center of the reflective portion A1 in the width direction) and extending in the direction perpendicular to the base surface 551b. Here, the width of a region where most of the first reflected light B passes through the output surface 551a in the sub-scanning direction is smaller than the width W1 of the reflective portion A1.

Therefore, when the width W2 of the diffusing portion A2 is smaller than the width W1 of the reflective portion A1 and, at the same time, the diffusing portion A2 is located in the virtual vertical plane passing through the center of the reflective portion A1 in the width direction and extending in the direction perpendicular to the base surface 551b, most of the first reflected light B can be diffused by the diffusing portion A2. It is thus possible to reduce the degree of non-uniformity in the distribution of light in the sub-scanning direction.

Figure 9:
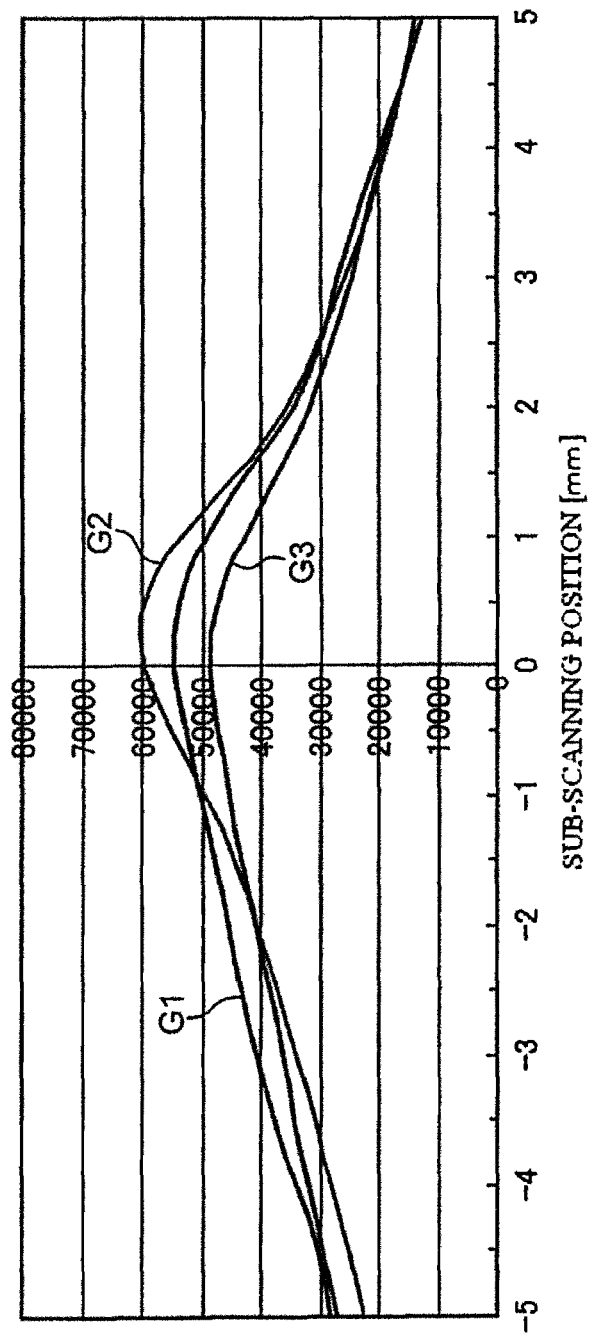
FIG. 9 is a graph showing illuminance on a document surface illuminated with light from a linear light source unit according to an embodiment of the present disclosure, the illuminance being obtained by a simulation.

FIG. 9 is a graph showing illuminance on a document surface illuminated with light from a linear light source unit, the illuminance being obtained by a simulation. In the graph, the vertical axis represents illuminance on a document surface in lux (1×), and the horizontal axis represents a position from the center 0 of an illuminated region in the sub-scanning direction in millimeters (mm). The curve G1 represents an example where the linear light source unit 511 of FIG. 2 is used, the curve G2 represents a first comparative example, and the curve G3 represents a second comparative example. In the first comparative example (curve G2), the output surface 551a does not have the diffusing portion A2 in the linear light source unit 511. In the second comparative example (curve G3), the diffusing portion A2 extends over the entire area of the output surface 551a in the sub-scanning direction in the linear light source unit 511.

Figure 10:
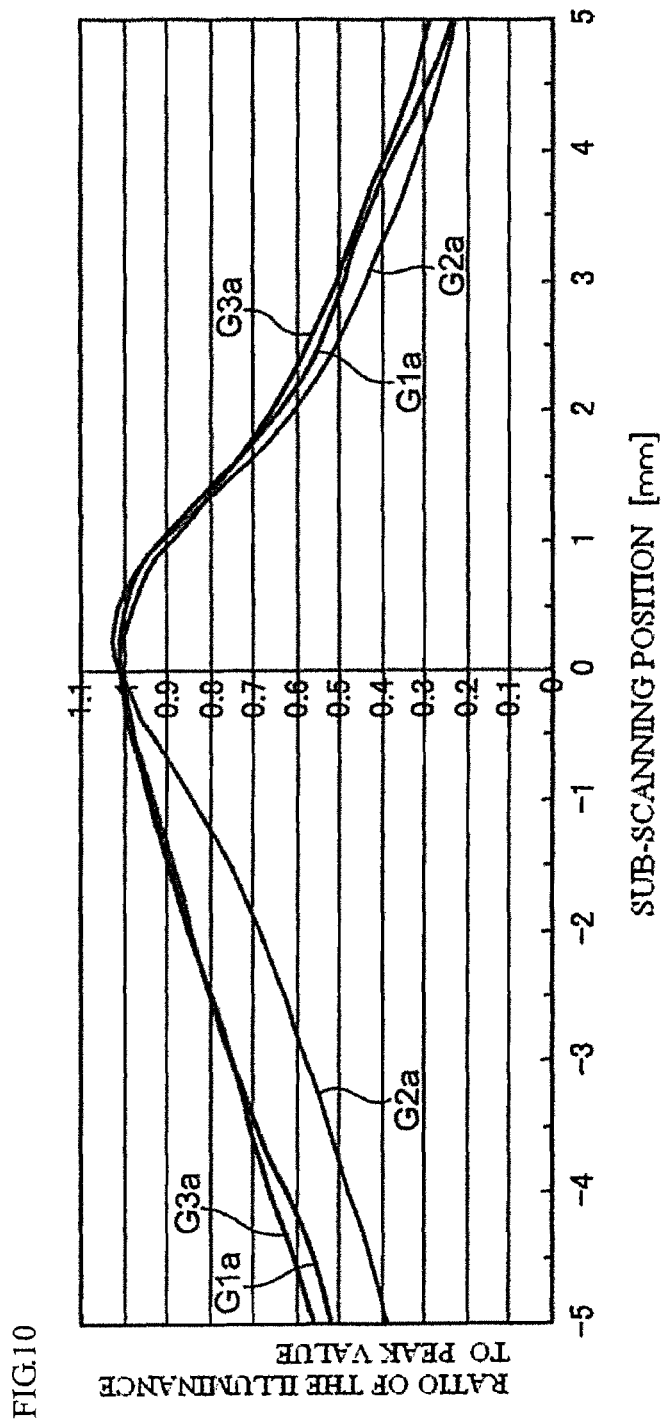
FIG. 10 is a graph obtained by converting the vertical axis (which represents illuminance on a document surface) of the graph of FIG. 9 into the ratio of the illuminance to a peak value (=1).

FIG. 10 is a graph obtained by converting the vertical axis (which represents illuminance on a document surface) of the graph of FIG. 9 into the ratio of the illuminance to a peak value (=1). Curves G1a, G2a, and G3a in FIG. 10 correspond to the curves G1, G2, and G3, respectively, in FIG. 9.

As shown in FIG. 9, at around a sub-scanning position of 0 mm, the curve G2 indicates the highest illuminance, the curve G1 indicates the next highest illuminance, and the curve G3 indicates the lowest illuminance. This shows that in the example with the linear light source unit 511 of FIG. 2 (curve G1), a loss of energy of light is smaller and the illuminance on the document surface is higher than those in the second comparative example (curve G3).

As compared to the first comparative example (curve G2), at around a sub-scanning position of 0 mm, the illuminance on the document surface is lower in the example with the linear light source unit 511 of FIG. 2 (curve G1). However, with the linear light source unit 511 of FIG. 2 (curve G1), the degree of non-uniformity in the distribution of light in the sub-scanning direction is reduced. Therefore, at a position more positive than a sub-scanning position of +1.7 mm, there is no substantial difference in illuminance between the example with the linear light source unit 511 of FIG. 2 (curve G1) and the first comparative example (curve G2), and at a position more negative than a sub-scanning position of −1.0 mm, the illuminance is higher in the example with the linear light source unit 511 of FIG. 2 (curve G1) than in the first comparative example (curve G2).

FIG. 10 shows that, in the sub-scanning direction, the width of a region where the ratio of illuminance to the peak illuminance is 0.8 or above is 3.75 mm in the example with the linear light source unit 511 of FIG. 2 (curve G1a), 2.5 mm in the first comparative example (curve G2a), and 3.75 mm in the second comparative example (curve G3a). This indicates that with the linear light source unit 511 of FIG. 2, as compared to the first comparative example where there is no diffusing portion A2 (curve G2a), light can be more effectively diffused in the sub-scanning direction and the degree of non-uniformity in the distribution of light in the sub-scanning direction can be more effectively reduced. Also, with the linear light source unit 511 of FIG. 2, just as in the case where the diffusing portion A2 extends over the entire area of the output surface 551a in the sub-scanning direction, the degree of non-uniformity in the distribution of light in the sub-scanning direction can be reduced.

The graphs of FIG. 9 and FIG. 10 show that, with the linear light source unit 511 of FIG. 2, it is possible to reduce the degree of non-uniformity in the distribution of light in the sub-scanning direction while reducing the risk of an increase in loss of light.

The image reading device 5 according to the present disclosure includes the light source 552, the light guiding member 551, and the image reading unit (image pickup element) 56. The light guiding member 551 has a rod-like shape, guides light from the light source 552 in the longitudinal direction, and illuminates a document with the light. The image reading unit 56 reads an image of the document illuminated with the light from the light guiding member 551. With this configuration, in the image reading device 5, it is possible to reduce the degree of non-uniformity in the distribution of light in the sub-scanning direction while reducing the risk of an increase in loss of light.

The image forming apparatus according to the present disclosure includes the light source 552, the light guiding member 551, the image reading unit 56, and the image forming section 4. The light guiding member 551 has a rod-like shape, guides light from the light source 552 in the longitudinal direction, and illuminates a document with the light. The image reading unit 56 reads an image of the document illuminated with the light from the light guiding member 551.

The image forming section 4 forms an image on a sheet on the basis of the image read by the image reading unit 56. With this configuration, an image is formed on a sheet based on the read image of a document illuminated with light which is distributed with a higher degree of uniformity in the sub-scanning direction. Thus, an image with higher quality can be formed on the sheet.

Figure 11:
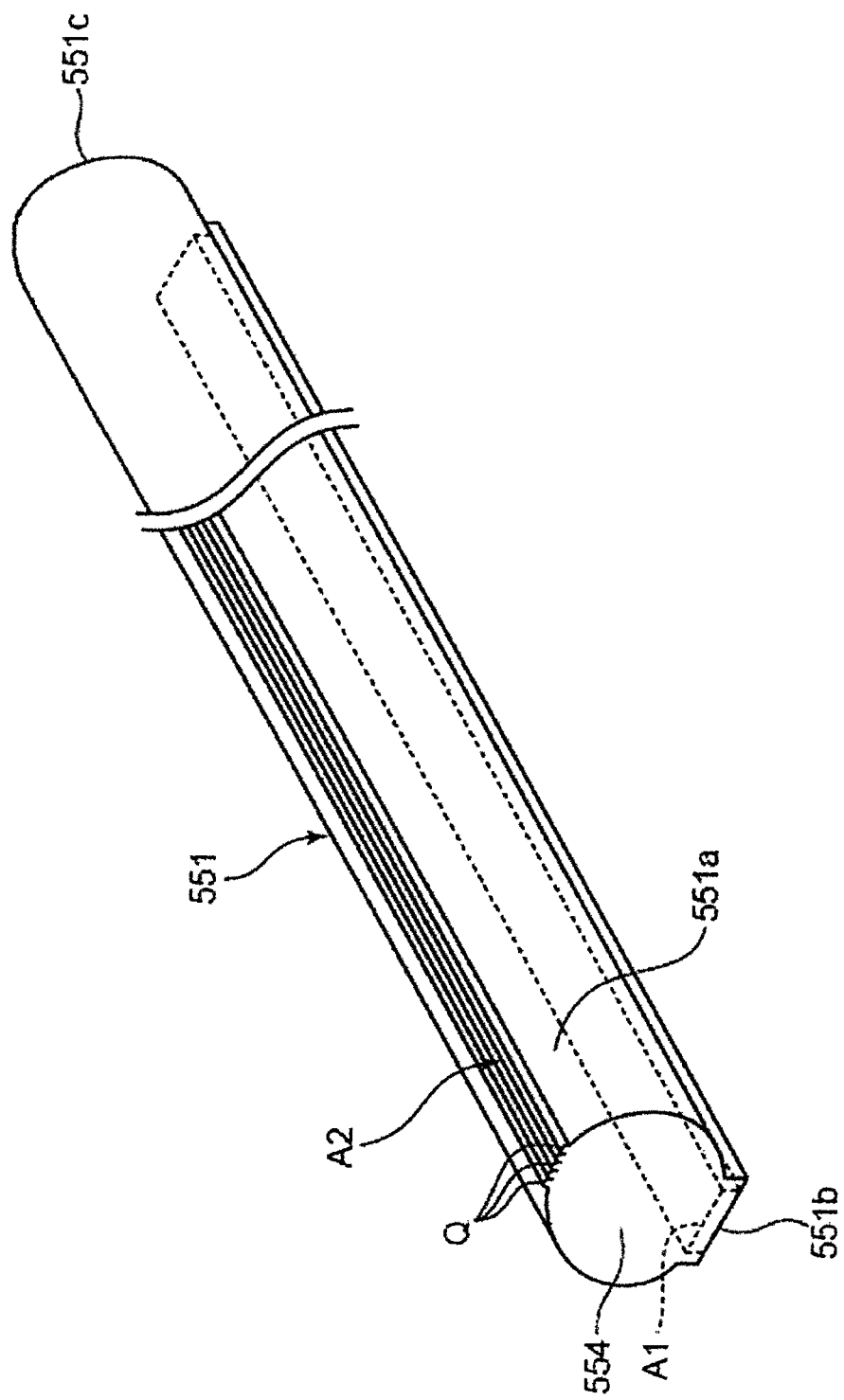
FIG. 11 is a schematic perspective view of the light guiding member according to another aspect of the present disclosure, as viewed from the output surface.

In the configuration illustrated in FIG. 5, the diffusing portion A2 extends across the entire length of the light guiding member 551, from the input surface 554 to the reflective end face 551c. Alternatively, as illustrated in FIG. 11, the diffusing portion A2 may extend along part of the entire length of the light guiding member 551. In this situation, the diffusing portion A2 is preferably formed in the vicinity of the input surface 554. Specifically, it is preferable that the diffusing portion A2 be formed on one side of a reference position, the one side being adjacent to the input surface 554. The reference position, which is for example determined by running a simulation, is the position where the ratio (illuminance) of the first reflected light B contained in light emitted from the output surface 551a is equal to the ratio (illuminance) of the second reflected light C contained in the light emitted from the output surface 551a.

In the vicinity of the input surface 554, the ratio of the first reflected light B contained in light emitted from the output surface 551a is high. Therefore, the first reflected light B is effectively diffused when the diffusing portion A2 is formed in the vicinity of the input surface 554. On the other hand, at a location remote from the input surface 554, the ratio of the first reflected light B contained in light emitted from the output surface 551a is low and the ratio of the second reflected light C is high. Therefore, the diffusing portion A2 is formed on one side of the reference position adjacent to the input surface 554, that is, formed in the vicinity of the input surface 554. Thus, light having a narrow range of distribution in the sub-scanning direction can be effectively diffused.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A rod-shaped light guiding member that guides light in a longitudinal direction thereof, the light guiding member comprising:
    an input surface being an end face of the light guiding member, the input surface being a surface on which light is inputted;
    an output surface in a periphery of the light guiding member, the output surface having a belt-like shape, extending in the longitudinal direction, and being a surface from which light is emitted; and
    a counter surface in the periphery of the light guiding member, the counter surface being opposite the output surface,
    wherein the output surface has a belt-like diffusing portion extending in the longitudinal direction, the diffusing portion being configured to diffuse light emitted from the output surface,
    the counter surface has a belt-like reflective portion extending in the longitudinal direction, the reflective portion being configured to reflect light toward the output surface,
    a width of the diffusing portion in a direction orthogonal to the longitudinal direction is smaller than a width of the reflective portion in the direction orthogonal to the longitudinal direction,
    the diffusing portion has a plurality of ridges extending in the longitudinal direction and arranged in the direction orthogonal to the longitudinal direction, and
    the plurality of ridges each have a round cross-sectional shape orthogonal to the longitudinal direction.

2. The light guiding member according to claim 1, wherein the reflective portion has a plurality of grooves spaced apart from one another in the longitudinal direction, the grooves each extending in a direction perpendicular to the longitudinal direction and functioning as a prism.

3. An image reading device comprising:
    a light source;
    the guiding member according to claim 1 configured to guide light from the light source in the longitudinal direction thereof to illuminate a document with the light; and
    an image reading unit configured to read an image of the document illuminated with the light from the light guiding member.

4. An image forming apparatus comprising:
    a light source;
    the light guiding member according to claim 1 configured to guide light from the light source in the longitudinal direction thereof to illuminate a document with the light;
    an image reading unit configured to read an image of the document illuminated with the light from the light guiding member; and
    an image forming section configured to form an image on a sheet based on the image read by the image reading unit.

5. A rod-shaped light guiding member that guides light in a longitudinal direction thereof, the light guiding member comprising:
    an input surface being an end face of the light guiding member, the input surface being a surface on which light is inputted;
    an output surface in a periphery of the light guiding member, the output surface having a belt-like shape, extending in the longitudinal direction, and being a surface from which light is emitted; and
    a counter surface in the periphery of the light guiding member, the counter surface being opposite the output surface,
    wherein the output surface has a belt-like diffusing portion extending in the longitudinal direction, the diffusing portion being configured to diffuse light emitted from the output surface,
    the counter surface has a belt-like reflective portion extending in the longitudinal direction, the reflective portion being configured to reflect light toward the output surface,
    a width of the diffusing portion in a direction orthogonal to the longitudinal direction is smaller than a width of the reflective portion in the direction orthogonal to the longitudinal direction, and
    the diffusing portion is located in a vertical plane passing through a center of the reflective portion in the width direction and extending in a direction perpendicular to the counter surface.

6. The light guiding member according to claim 5, wherein the reflective portion has a plurality of grooves spaced apart from one another in the longitudinal direction, the grooves each extending in a direction perpendicular to the longitudinal direction and functioning as a prism.

7. An image reading device comprising:
a light source;
the guiding member according to claim 5 configured to guide light from the light source in the longitudinal direction thereof to illuminate a document with the light; and
an image reading unit configured to read an image of the document illuminated with the light from the light guiding member.

8. An image forming apparatus comprising:
a light source;
the guiding member according to claim 5 configured to guide light from the light source in the longitudinal direction thereof to illuminate a document with the light;
an image reading unit configured to read an image of the document illuminated with the light from the light guiding member; and
an image forming section configured to form an image on a sheet based on the image read by the image reading unit.

9. A rod-shaped light guiding member that guides light in a longitudinal direction thereof, the light guiding member comprising:
an input surface being an end face of the light guiding member, the input surface being a surface on which light is inputted;
an output surface in a periphery of the light guiding member, the output surface having a belt-like shape, extending in the longitudinal direction, and being a surface from which light is emitted; and
a counter surface in the periphery of the light guiding member, the counter surface being opposite the output surface,
wherein the output surface has a belt-like diffusing portion extending in the longitudinal direction, the diffusing portion being configured to diffuse light emitted from the output surface,
the counter surface has a belt-like reflective portion extending in the longitudinal direction, the reflective portion being configured to reflect light toward the output surface,
a width of the diffusing portion in a direction orthogonal to the longitudinal direction is smaller than a width of the reflective portion in the direction orthogonal to the longitudinal direction, and
the diffusing portion is formed on one side of a predetermined reference position on the output surface, the one side being adjacent to the input surface.

10. An image reading device comprising:
a light source;
the guiding member according to claim 9 configured to guide light from the light source in the longitudinal direction thereof to illuminate a document with the light; and
an image reading unit configured to read an image of the document illuminated with the light from the light guiding member.

11. the light guiding member according to claim 9, wherein the reflective portion has a plurality of grooves spaced apart from one another in the longitudinal direction, the grooves each extending in a direction perpendicular to the longitudinal direction and functioning as a prism.

12. An image forming apparatus comprising:
a light source;
the guiding member according to claim 9 configured to guide light from the light source in the longitudinal direction thereof to illuminate a document with the light;
an image reading unit configured to read an image of the document illuminated with the light from the light guiding member; and
an image forming section configured to form an image on a sheet based on the image read by the image reading unit.

* * * * *